United States Patent [19]

Greer

[11] 4,065,995

[45] Jan. 3, 1978

[54] POCKET FINGER EXERCISE BOARD

[76] Inventor: Michael M. Greer, Box 22, McGrath, Alaska 99627

[21] Appl. No.: 730,921

[22] Filed: Oct. 8, 1976

[51] Int. Cl.² ............................................. G09B 15/06
[52] U.S. Cl. .................................................... 84/465
[58] Field of Search ................. 84/314, 293, 453, 465, 84/467, 470, 485

[56] References Cited

U.S. PATENT DOCUMENTS

| 351,111 | 10/1886 | Kaspar | 84/465 |
|---|---|---|---|
| 936,181 | 10/1909 | Steckelberg | 84/465 |
| 3,218,904 | 11/1965 | Hartman | 84/485 |
| 3,403,590 | 10/1968 | Quinton | 84/470 |

Primary Examiner—Lawrence R. Franklin
Attorney, Agent, or Firm—Sughrue, Rothwell, Mion, Zinn and Macpeak

[57] ABSTRACT

A pocket finger exercise board takes the form of a two part molded plastic assembly including an open top, elongated hollow body member with a planar cover member fixed to and overlying the body member. The cover member has notches at opposed ends, and a series of transverse ribs project from its upper surface with a string strung in multiple turn fashion on the cover member across the transverse ribs and within the notches and fixed at respective ends to the lower surface of the cover member. The cover member is screwed to the body member to permit dis-assembly and restringing.

84 Claims, 3 Drawing Figures

POCKET FINGER EXERCISE BOARD

BACKGROUND OF THE INVENTION

1. FIELD OF THE INVENTION

This invention relates to the field of string musical instruments, and more particularly, to a pocket finger exercise string board simulating a stringed instrument to encourage string instrument players to strengthen their fingers through grip exercise.

2. DESCRIPTION OF THE PRIOR ART

Persons learning to play string musical instruments, and in particular children, do not have sufficient muscle strength in their fingers to permit long practice or to participate in the playing of stringed instruments without fatigue. Such instruments are composed of a number of generally parallel, laterally spaced strings which are strung under tension across the upper face of the instrument, permitting the instrument to be grasped by its bottom within the palm of the player's hand and permitting the fingers to rest on the upper surface carrying the strings for applying pressure to the tensioned strings to vary the tone during playing of the instrument, the positions of pressure application to the string being shifted to produce different notes, etc.

It is an object of the present invention to provide a device permitting children or other persons who play string musical instruments to strengthen their fingers so that the playing of the actual string instrument may be achieved with less fatigue and with greater dexterity.

SUMMARY OF THE INVENTION

The present invention constitutes a pocket finger exercise board comprising preferably a two part molded plastic assembly in the form of an open top elongated hollow body member and a planar cover member having width and length dimensions corresponding to those of the body member and having opposed ends and top and bottom faces with the cover member fixed to the body member in overlying position. The cover member carries laterally spaced notches on both ends and a string is strung under tension longitudinally in multiple turn fashion about the cover member, across a series of longitudinally spaced, laterally extending ribs on the top face of the cover member with the string turns received within said notches respectively at the ends of the cover member. The string is fixed at its ends to the bottom face of the cover member such that upon assembly, the string fixing means lies within the hollow body member. The molded plastic cover member includes in addition to the integral molded ribs on its top face, first posts depending from the cover member at fore and aft positions. Holes are drilled in the body member in the bottom of the body member facing the posts and screws projecting through the holes in the body member are threaded to the post to fix the cover member to the body member after stringing. Oblique, elongated stiffening ribs may be integrally molded on the bottom face of the cover member, the ribs being spaced and extending generally from the notches on one end of the cover member to the notches on the other end to stiffen the cover member and to guide the turns of the string between notches. Further, longitudinally spaced guide bars may be formed integrally with the cover member projecting from the bottom face of the cover member along both sides to locate the sides of the cover member with respect to the sides of the hollow body member to which the cover member is fixed. Further, guide pins projecting upwardly from the edge of the body member along its sides are received within small holes of a slightly larger diameter within the bottom face of the cover member at corresponding positions to guide the cover member onto the body member during screw coupling of the two molded parts of the plastic pocket finger exercise board. A second pair of posts integral with the cover member project from the bottom face of the cover member towards the hollow body member adjacent respective ends of the cover member and carry screws for frictionally locking the ends of the string and for maintaining the string wound about the cover member under tension.

DESCRIPTION OF THE PREFERRED EMBODIMENT

Figure 1:
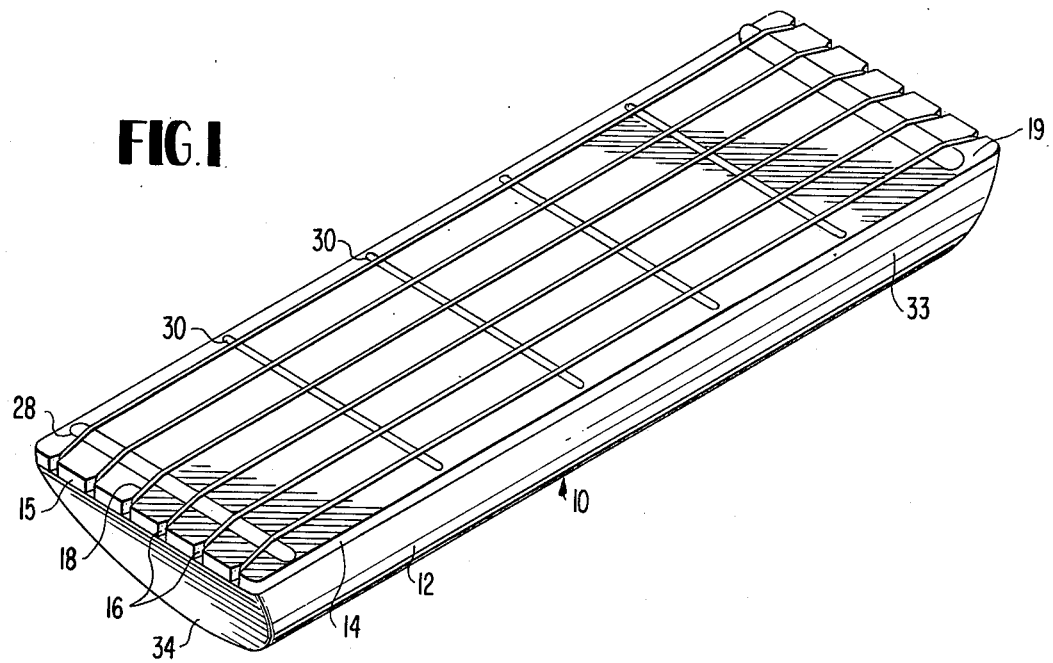
FIG. 1 is a perspective view of the molded plastic finger exercise board of the present invention.
Figure 2:
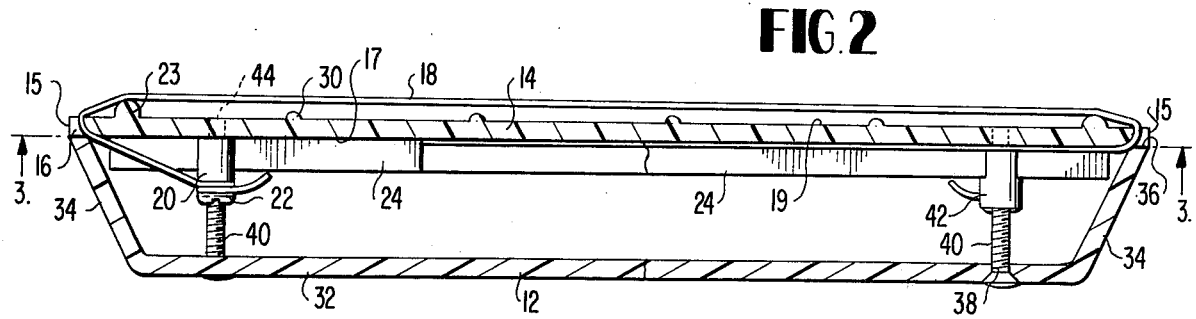
FIG. 2 is a sectional elevational view of the finger exercise board taken about line 2—2 of FIG. 1.

Referring to the figures, the pocket finger exercise board of the present invention is indicated generally at 10 in FIG. 1 and comprises a two part molded plastic assembly. An elongated hollow body member 12 supports an elongated planar cover member 14, the width and length dimensions of both members being essentially equal with the cover member overlying the open top of the hollow body member 12. Cover member 14 is generally rectangular in form defining a bottom face 17 and a top face 19 and having ends 15 formed with a plurality of V-shaped notches 16. The notches 16 permit a string 18 to be strung longitudinally about the cover member 14 in multiple turn fashion, each turn received within a particular notch 16. In this respect, integrally molded with the cover member 14 are a pair of posts 20 at respective ends of the cover member and at oblique corners, the posts 20 having threaded thereto mounting screws 22 which frictionally lock given ends of the string 18 such that the string is strung on the cover member and maintained under tension. The length of the posts 20 is somewhat less than the vertical height of the hollow body member 12, such that the posts can easily be accommodated by the hollow body member when the cover is mechanically locked thereto.

In simulating a conventional string instrument or at least a portion thereof, the top face 19 of the cover member is provided with laterally extending longitudinally spaced, integrally molded ribs, including end ribs 28 and a number of intermediate ribs 30. The end ribs 28 preferably project further from the top surface 19 of the cover member than ribs 30, so that the turns of string 18 which extend across the top face 19 of the cover member do not touch and are spaced from the intermediate ribs 30.

Figure 3:
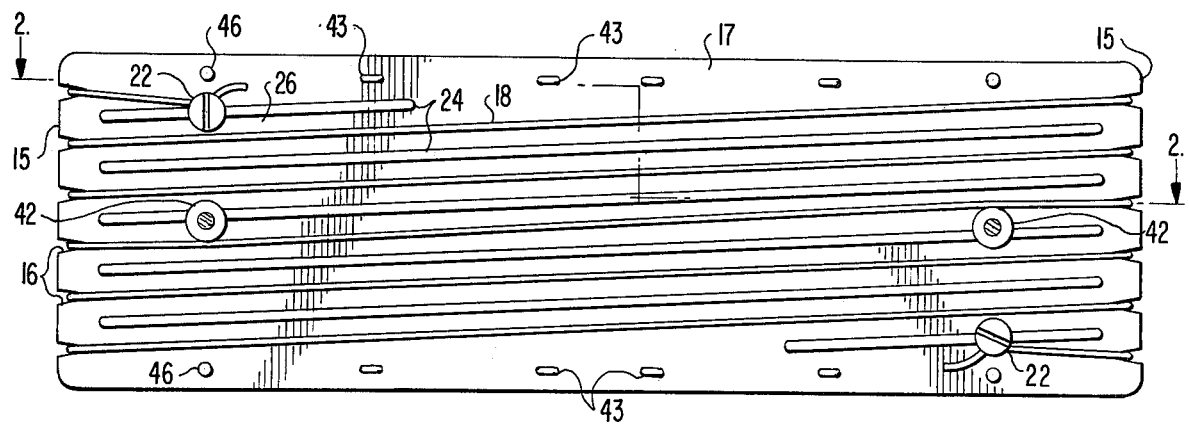
FIG. 3 is a sectional view of the finger exercise board taken about line 3—3 of FIG. 2.

The hollow body member 10 is arcuate in lateral cross-section forming a bottom wall 32, opposed sidewalls 33, upwardly and outwardly inclined end walls 34. Sidewalls 33 and end walls 34 form a generally rectangular horizontal edge 36 upon which the perimeter of the cover member 14 rests. In order to detachably couple or connect the cover member 14 to the hollow body member 12, the cover member 14 is further provided with a second pair of posts 42 which for convenience are integrally molded along the center line of the cover member and project from the bottom face 17 thereof. The posts are generally of the same height or vertical dimension as posts 20 and in this case threadably receive the ends of mounting screws 40, the screws 40 projecting through holes 38 within the bottom wall 32 of the hollow body member 12 at longitudinal positions corresponding to posts 42 of the cover member and lying on the center line of the body member 12. Further, to facilitate the alignment of the cover member with respect to the body member, preferably small diameter holes 44 are drilled within the bottom face of the cover member along its edge adjacent respective ends and small diameter pins 46 project along both longitudinal edges of body member 12 and are integrally molded therewith. Pins 46 are received within holes 44, the holes 44 extending only partially through the cover member. Further, FIG. 3, at longitudinally spaced positions guide bars 43 constituting short height projections are integrally molded within the bottom face 17 of the cover member at positions just inside the edge 36 of the hollow body member so as to further locate the cover member with respect to the body member during tightening down of screws 40 for detachably mounting the cover member 14 to the hollow body member 12. Preferably, for strengthening the relatively thin, planar cover member 14, a number of spaced, oblique but generally longitudinally extending ribs 24 are formed on the bottom face 17 of the cover member and define narrow slots 26 therebetween which act as string guides during stringing of the cover member and improve the stiffness of the cover member, thereby resisting deflection longitudinally of cover member 14 during use of the pocket finger exercise board 10.

After stringing and coupling parts 12 and 14 to form a complete assembly as indicated at 10 in FIG. 1, the device is used by grasping it in one hand such that the bottom wall 32 of the hollow body member 12 rests in the palm of the user's hand, and the fingers of the user curve about and are pressed against either side of the assembly. The ends of the fingers overlie the top face 19 of the device and the fingers in normal fashion of playing a conventional string instrument are pressed against the turns of string 18 at any point intermediate of the larger end ribs 28, thereby depressing the string and tending to squeeze the two part molded exercise board. The principle employed in strengthening the muscles of the fingers of the user is similar to that of squeezing a rubber ball which is employed by athletes in gaining finger stringth. At the same time, the pocket finger exercise board of the present invention may be employed for practicing simple finger movements simulating the playing of a similar string instrument. While the illustrated embodiment employs six strings or in this case six turns of a single string, the number of turns may be varied to simulate a four string instrument etc. The overall length of the illustrated embodiment is preferably on the order of 6 to 8 inches such that the exercise board is compact and pocket size for transportability. Further, in the construction of the device, and while it is preferred that the screws project through the hollow body member and are threaded to posts integrally molded within the cover member, the opposite arrangement may be equally appropriate. Further, while the two part molded plastic assembly is preferred to permit the string 18 to be replaced should it be broken, it is envisioned that the pocket exercise board may have the molded plastic components 12 and 14 adhesively bonded or fusion bonded at their interfaces after the device is strung, preventing separation.

While the invention has been particularly shown and described with reference to a preferred embodiment thereof, it will be understood by those skilled in the art that various changes in form and details may be made therein without departing from the spirit and scope of the invention.

What is claimed is:

1. A pocket finger exercise board comprising:
    an open top elongated hollow body member having a bottom wall, end and side walls and forming coplanar edges,
    a planar cover member having width and length dimensions corresponding to those of said body member and forming opposed ends and top and bottom faces,
    a plurality of transversely extending, longitudinally spaced ribs on said cover member top face,
    laterally spaced notches on both ends of said cover member,
    at least one string, strung longitudinally about said cover member from end to end and being positioned within said notches and forming a plurality of spaced parallel string portions extending longitudinally across the top face of said cover member and in contact with said transversely extending ribs,
    means for fixing the ends of said at least one string to the bottom face of said cover member under tension, and
    means for fixing said cover member to the open top of said body member with said string end fixing means located interiorly of said hollow body member.

2. The pocket finger exercise board as claimed in claim 1, wherein said hollow body member and said planar cover member comprise interfitting, molded plastic parts, and wherein said transverse ribs on the top face of said cover member are integrally molded therein, said means for fixing the ends of said at least one string comprises a pair of first posts, said first posts positioned adjacent respective ends of said cover member, projecting from said bottom face and being of a length such that their ends are remote from the bottom wall of said hollow body member when said cover is fixed to said body member, and screws threaded to the ends of said posts and frictionally gripping respective ends of said at least one thread between the screw head and the end of said post, and wherein said means for fixing said cover member to said body member in overlying position comprises second posts projecting from the bottom face of said cover member towards said hollow body member and holes within said hollow body member at positions corresponding to said second posts and screws projecting through said holes and threaded to said second posts.

3. The pocket finger exercise board as claimed in claim 2, further comprising: elongated oblique stiffening ribs projecting from the bottom face of said cover member and extending substantially the full length between said notches and being laterally spaced to form guide slots for respective turns of said at least one string strung longitudinally about said cover member and for stiffening said cover member longitudinally to resist deformation during grasping of the finger exercise board by the user and the application or pressure through the user's fingers on said at least one string.

4. The pocket finger exercise board as claimed in claim 3, further comprising a plurality of longitudinally spaced integral guide bars projecting from the bottom face of said cover member at positions adjacent the surface of said hollow body member side walls for aligning said cover member during fixing of said cover member to said body member, and a plurality of small diameter holes within the bottom face of said over member along its perimeter and extending partially through said cover member and pins projecting from the upper edge of said hollow body member along both sides at positions corresponding to said small diameter holes and being received therein for locating said cover member on said hollow body member during tightening of said screws which pass through said hollow body member and threadably engage said second posts projecting from the bottom face of said cover member for fixing said cover member to said body member.

5. The pocket finger exercise board as claimed in claim 1, further comprising: elongated oblique stiffening ribs projecting from the bottom face of said cover member and extending substantially the full length between said notches and being laterally spaced to form guide slots for respective turns of said at least one string strung longitudinally about said cover member and for stiffening said cover member longitudinally to resist deformation during grasping of the finger exercise board by the user and the application of pressure through the user's fingers on said at least one string.

6. The pocket finger exercise board as claimed in claim 5, further comprising a plurality of longitudinally spaced integral guide bars projecting from the bottom face of said cover member at positions adjacent the inside surface of said hollow body member sidewalls for aligning said cover member during fixing of said cover member to said body member, and a plurality of small diameter holes within the bottom face of said cover member along its perimeter and extending partially through said cover member and pins projecting from the upper edge of said hollow body member along both sides at positions corresponding to said small diameter holes and being received therein for locating said cover member on said hollow body member during tightening of said screws which pass through said hollow body member and threadably engage said second posts projecting from the bottom face of said cover member for fixing said cover member to said body member.

* * * * *